United States Patent [19]

Stifelman

[11] 4,369,113

[45] Jan. 18, 1983

[54] HIGH STRENGTH SPIN-ON FILTER

[75] Inventor: Jack Stifelman, Minneapolis, Minn.

[73] Assignee: Donaldson Company, Inc.

[21] Appl. No.: 316,144

[22] Filed: Oct. 29, 1981

[51] Int. Cl.³ .............................................. B01D 27/08
[52] U.S. Cl. .............................. 210/440; 210/DIG. 17
[58] Field of Search ............... 210/130, 440, DIG. 17, 210/444

[56] References Cited

U.S. PATENT DOCUMENTS

| | | | |
|---|---|---|---|
| 3,000,506 | 9/1961 | Hultgren | 210/DIG. 17 |
| 4,028,243 | 6/1977 | Offer et al. | 210/DIG. 17 |
| 4,144,168 | 3/1979 | Thornton | 210/130 |
| 4,246,109 | 1/1981 | Manders | 210/90 |
| 4,253,954 | 3/1981 | Midkiff et al. | 210/168 |
| 4,324,660 | 4/1982 | Peyton | 210/440 |

Primary Examiner—John Adee
Attorney, Agent, or Firm—Merchant, Gould, Smith, Edell, Welter & Schmidt

[57] ABSTRACT

The specification discloses an improved high strength spin-on fluid filter (10) including a housing (12), cover (28) and filter element assembly (18). The cover (28) includes a hub (30), rim (34), and radial ribs (32) and is preferably formed as an integral unit. The open end of the housing (12) is folded inwardly and back on itself over the rim (34) to form a folded connection (47) between the cover (28) and housing. Spacers (52) are preferably utilized around the lower end of the filter element assembly (18) to assure pressure equalization thereacross.

23 Claims, 5 Drawing Figures

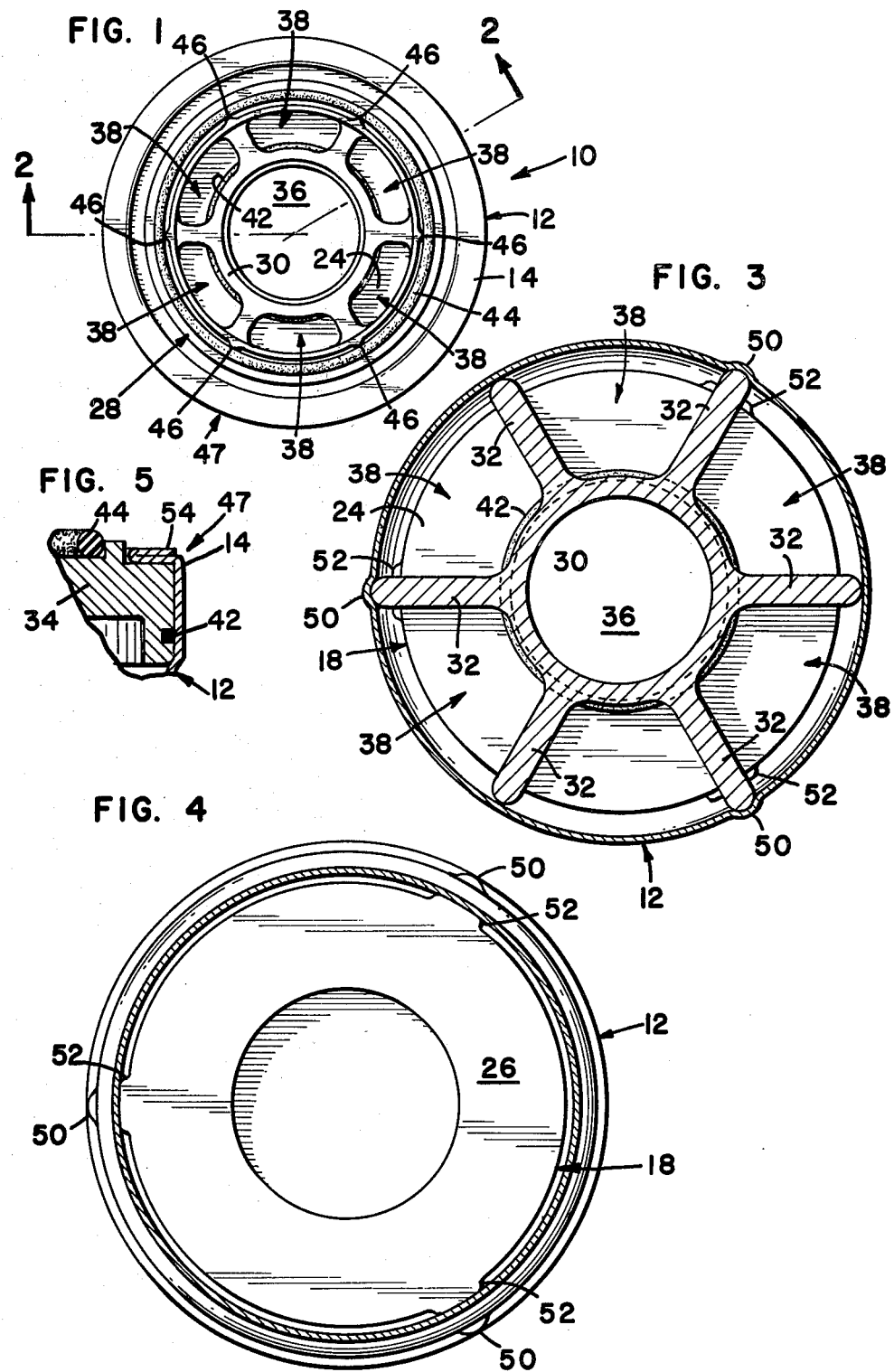

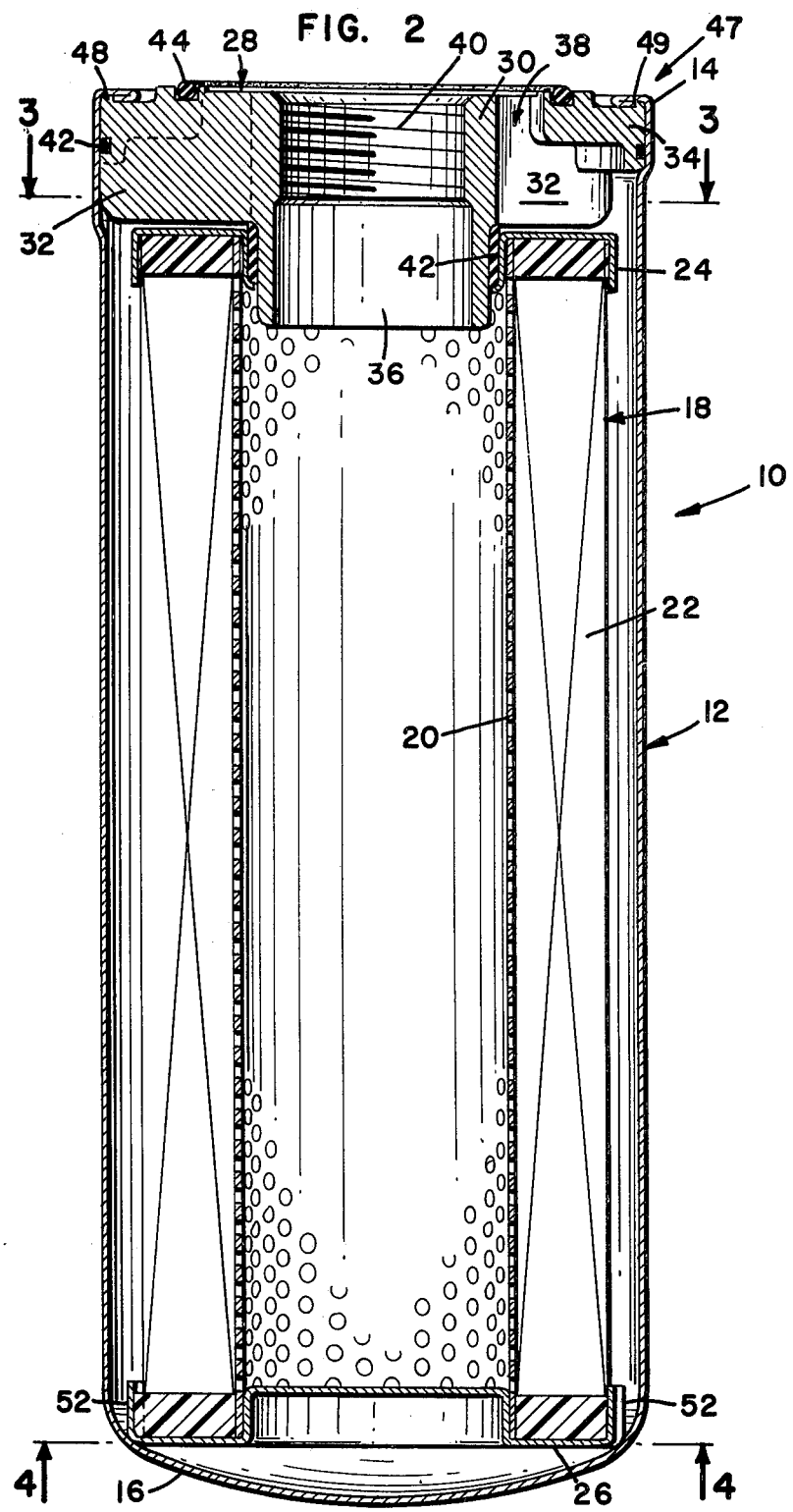

HIGH STRENGTH SPIN-ON FILTER

TECHNICAL FIELD

The present invention relates generally to a fluid filter of the spin-on type, and more particularly relates to a spin-on filter incorporating a rigid, unitary cover which is secured to the filter housing by means of an inwardly folded lip in a manner which results in increased pressure capacity.

BACKGROUND ART

Spin-on filters have been employed in a variety of applications including hydraulic systems and engine lubrication systems. Such filters generally include a filter element within a can or housing having a cover or attachment plate at one end thereof by which the filter can be screwed onto or off a filter head. A central opening and several surrounding openings in the cover direct flow through the filter and filter element therein, which flow can be in either an inside/out or outside/in pattern. A circular gasket on the outside of the cover serves as the external seal between the filter and filter head, while another circular gasket on the inside of the cover functions as the internal seal between the filter element and cover. A spring is often provided in the lower end of the housing to maintain the filter element in sealing engagement with the cover. Spin-on filters are typically intended to be used only once before removal and replacement.

Although satisfactory in low and medium pressure applications, the spin-on filters of the prior art have not been particularly suitable for use in high pressure applications, such as in hydraulic transmission pumps, where spikes or surges up to about 1000 psi can occur. Most of the spin-on filters currently available are adaptations of the type used in engine lubrication systems. The covers of the spin-on filters available heretofore are typically constructed of a stamped steel base disc and a relatively thinner secondary disc spot welded thereto. The base disc includes an extruded, relatively shallow, internally threaded neck portion by which the filter can be connected to a filter head. Flow openings are punched into the base disc around the neck portion. The lip at the open end of the housing is connected by means of a lock seam to the periphery of the secondary disc, which is also formed to serve as a seat for the external gasket. In this design fatigue failure is most likely to occur at the rolled lock seam or at the spot welds. A burst failure is most likely to occur either upon bending of the cover which allows leakage past the external gasket, or upon unfolding of the rolled lock seam. The prior spin-on filters have thus been susceptible to failure at the cover and/or at the connection between the cover and housing.

Various attempts have been made to strengthen and otherwise increase the pressure capacities of the prior spin-on filters. Different materials and/or increased material thicknesses thereof have been used, improved lock seams have been developed, and reinforcing profiles have been formed into the cover plates. These efforts have resulted in increasing the burst capacities of such spin-on filters up to about 500 psi, and have therefore been of some success; however, even the current filters having a 500 psi burst capacity have been found marginal in certain applications. Manufacturing limitations also exist for the thickness of material which can be punched or press formed to construct spin-on filters according to conventional techniques.

There is thus a need for an improved spin-on fluid filter of high strength construction capable of withstanding pressure surges and spikes up to about 1000 psi or more.

SUMMARY OF INVENTION

The present invention comprises an improved spin-on filter which overcomes the foregoing and other difficulties associated with the prior art. In accordance with the invention, there is provided a high strength spin-on fluid filter comprising a generally cylindrical filter housing having open and closed ends, a filter element disposed within the housing, and a cover attached to the open end of the housing. The cover, which is preferably of one-piece construction, includes a central hub and a plurality of ribs radially interconnecting the hub with a circular rim. Flow openings terminating on opposite sides of the filter element inside the housing are also provided in the cover. Gasket seats are formed in the outer and circumferential surfaces of the rim of the cover. The open end of the housing is folded inwardly over the rim of the cover in a manner which and approximates the effect of a flat bottom in a pressure vessel whereby stresses are reacted primarily in shear rather than bending. A radial seal is preferably provided between the upper end of the filter element and the interior end of the hub on the cover to allow more dimensional tolerance while achieving a reliable internal seal without the use of the spring between the lower ends of the filter element and housing. In the preferred embodiment, indentations are provided around the upper end of the housing to receive certain relatively longer ribs on the cover for antirotation purposes. Spacers are preferably provided at intervals about the lower end of the filter element to ensure pressure equalization across the element.

BRIEF DESCRIPTION OF DRAWING

A better understanding of the invention can be had by reference to the following Detailed Description in conjunction with the accompanying Drawing, wherein:

FIG. 1 is a top view of a spin-on fluid filter incorporating the invention;

FIG. 2 is an enlarged axial sectional view taken along lines 2—2 of FIG. 1 in the direction of the arrows;

FIG. 3 is a cross-sectional view taken along lines 3—3 of FIG. 2 in the direction of the arrows;

FIG. 4 is a cross-sectional view taken along lines 4—4 of FIG. 2 in the direction of the arrows; and FIG. 5 is a partial sectional view showing another form of the cover/housing connection.

DETAILED DESCRIPTION

Referring now to the Drawing, wherein like reference numerals denote corresponding elements throughout the views, and particularly referring to FIGS. 1 and 2, there is shown a spin-on fluid filter 10 incorporating the invention. Filter 10 is particularly adapted for filtration of oil, as for example in a hydrostatic transmission or other hydraulic system, and is constructed to withstand elevated pressures on the order of 1000 psi as will be explained more fully hereinafter.

Filter 10 comprises a generally cylindrical filter housing 12 having an open top end 14 and a closed bottom end 16. Housing 12 is of generally thin-walled construction, and is typically formed by stamping or drawing from metal such as steel or other suitable material. For example, housing 12 can be about 9.5 inches long, 3.6 inches in diameter, and about 22 gauge or 0.03 inches in wall thickness.

A filter element assembly 18 is located inside the filter chamber defined by housing 12. Assembly 18 includes a perforated cylindrical core 20 surrounded by a filter element 22, both of which are supported between a pair of end caps 24 and 26. The lower end cap 26 extends across and closes the bottom end of the perforated core 20, while the top end cap 24 includes a central opening therein which receives and surrounds a portion of the cover 28 secured across the open end 14 of housing 12. The filter element 22 is typically potted in place as shown between the end caps 24 and 26.

The construction of cover 28 and its manner of attachment to filter housing 12 are significant features of the present invention. The cover 28 is preferably formed, such as by casting, into a rigid integral unit. Cover 28 can be formed of any suitable material, such as aluminum or other metal. In some chemical filtration applications, for example, it may be desirable to form cover 28 by molding from plastic or other synthetic material. The increased rigidity of cover 28 avoids the bending and leakage problems experienced with the stamped, two-piece covers or attachment plates of the prior art.

The cover 28 comprises a central axially extending hub 30 which is interconnected by a plurality of radial webs or ribs 32 with a generally circular outer rim 34. As illustrated, filter 10 includes six ribs 32 at equally spaced intervals although the number of ribs and spacing therebetween are not critical to practice of the invention. As is best seen in FIG. 1, the hub 30 defines a central opening 36 extending through cover 28 and terminating inside the filter assembly 18. Openings 38 definded between the ribs 32 and surrounding hub 30 terminate on the outside of the filter assembly 18. Openings 36 and 38 thus serve as the flow ports whereby fluid is conducted through filter 10 in either an inside/out or outside/in flow pattern relative to the filter element 22.

Threads 40 are provided on the upper internal surface of the hub 30 for connecting filter 10 to a filter head (not shown). The depth of cover 28 and hub 30 thereof enable provision of a greater number of threads 40 than was possible with the filters heretofore, thereby reinforcing the external connection point of the filter.

As is best seen in FIG. 2, the hub 30 of cover 28 preferably extends a substantially below ribs 32 and into the upper end of the filter assembly 18. This provides a longer circumferential sealing surface and enables usage of a radial seal 42 between the upper end of the filter assembly 18 and cover 28, which in turn accommodates more angular tolerance without leakage and enables filter 10 to be assembled without any auxiliary springs for maintaining the filter assembly and housing in sealing engagement. The prior spin-on filters available heretofore have generally utilized circular gaskets or O-rings in abutting contact between the ends of the filter assemblies and covers. Such seals must be maintained in relatively more precise alignment, usually by means of an auxiliary spring, for proper sealing. The relatively deep configuration of hub 30 together with the use of radial seal 42 facilitates a better internal seal inside filter 10 without the complication or expense of any auxiliary springs.

Two other seals are provided on the cover 28 of filter 10. A gasket or O-ring 42 is provided in a circumferential groove formed around rim 34 for sealing purposes between cover 28 and the upper end 14 of housing 12. Another gasket or O-ring 44 is seated in a groove formed in the end of rim 34 for external sealing purposes between filter 10 and the filter attachment (not shown). The groove within which O-ring 44 is seated preferably includes a plurality of projections 46, which are best seen in FIG. 1, for retaining the O-ring in place.

Referring particularly to FIG. 2, cover 28 and housing 12 are secured together by a folded connection 47. Cover 28 includes a peripheral lip 48 on rim 34 over which the open end 14 of housing 12 is folded to interconnect the cover and housing. The upper end 14 of housing 12 surrounds rim 34 and extends inwardly over the peripheral lip 48 on cover 28. The terminus of the upper end 14 of filter housing 12 is folded inwardly and underneath itself into a P-shaped fold 49 behind lip 48. The slightly enlarged open housing end 14 is initially straight until housing 12 and cover 28 are brought together, after which this connection can be achieved by means of a spinning operation. It has been found that use of connection 47 approaches the effect of a flat bottom pressure vessel and results in greater resistance to unrolling such that the stress is reacted more in shear than in bending whereby a higher pressure capacity can be achieved. The use of this particular joint configuration comprises a very significant feature of this invention.

Referring now to FIGS. 2 and 3, a positive mechanical interlock is preferably provided between the filter housing 12 and cover 28 to prevent rotation therebetween when tightening or loosening filter 10. In the illustrated embodiment this is achieved by providing indentations 50 at intervals around the open end 14 of housing 12 for receiving certain of the webs or ribs 32 which are relatively longer in the radial direction than the other ribs. As illustrated, alternate ribs 32 are adapted for this purpose, being seated in indentations at equal intervals around the upper end of housing 12. Other types of physical interlocks can also be utilized.

Referring now to FIGS. 2 and 4, the bottom end cap 26 of filter assembly 18 preferably includes a plurality of spacers 52 at circumferentially spaced intervals to assure pressure equalization thereacross and to prevent sealing off the lower-most end of housing 12, which could cause the bottom end cap could to collapse under pressure. The spacers 52, three of which are shown although any suitable number can be employed, are preferably located at equally spaced circumferential intervals and are formed integral with the bottom end cap 26.

Although the use of a peripheral lip 48 and a P-shaped fold 49 comprises the preferred construction of connection 47, the peripheral lip can be omitted and an inverted b-shaped fold 54 as shown in FIG. 5 can be utilized. That is instead of being folded underneath itself, the terminus of the upper end 14 of housing 12 is folded back on itself.

From the foregoing, it will be apparent that the present invention comprises an improved spin-on fluid filter having several advantages over the prior art. The filter herein utilizes an integral cover of greater rigidity which is adapted to facilitate both internal and external sealing as well as connection with the cylindrical housing by means of a unique folded joint such that higher pressure capacities can be achieved. Other advantages will be evident to those skilled in the art.

Although particular embodiments of the invention have been illustrated in the accompanying Drawing and described in the foregoing Detailed Description, it will be understood that the invention is not limited to the embodiments disclosed, but is intended to embrace any alternatives, modifications, and rearrangements and/or substitutions of elements falling within the scope of the invention as defined by the following claims.

I claim:

1. A spin-on filter, comprising:
   a generally cylindrical housing with an open end and closed end;
   a generally cylindrical filter element disposed within said housing, said filter element having an open end and a closed end;
   a rigid cover disposed in the open end of said housing;
   said cover being of unitary construction including a hub extending substantially into said housing and defining a first flow opening, a circular rim, and radial ribs connected between the hub and rim and defining second flow openings;
   the open end of said housing surrounding and being folded inwardly over the periphery of the rim into a predetermined fold to interconnect said cover and housing;
   a first seal between said cover and said housing;
   a second seal between the open end of said filter element and said cover;
   a third seal seated in a groove formed in the rim of the said cover and surrounding the flow openings; and
   means formed on said cover for removably mounting the filter.

2. The spin-on filter of claim 1, wherein the ribs of said cover are circumferentially spaced at substantially equal intervals and are of substantially uniform depth and thickness.

3. The spin-on filter of claim 1, wherein the rim of said cover includes a peripheral lip and wherein the upper end of said housing is folded in a generally P-shaped cross-sectional configuration over the peripheral lip on the rim of said cover.

4. The spin-on filter of claim 1, wherein the upper end of said housing is folded in an inverted generally b-shaped cross-sectional configuration over the rim of said cover.

5. The spin-on filter of claim 1, wherein said first seal is disposed in a circumferential groove formed in the rim of said cover.

6. The spin-on filter of claim 1, wherein said mounting means comprises threads formed on the hub of said cover.

7. The spin-on filter of claim 1, wherein said second seal comprises a radial seal circumferentially surrounding at least a portion of the hub of said cover extending into said housing.

8. The spin-on filter of claim 1, further including:
   means for constraining said cover and housing against relative rotation.

9. The spin-on filter of claim 1, further including:
   spacers disposed between the closed end of said filter element and said housing for ensuring pressure equalization across said filter element.

10. A spin-on filter, comprising:
    a generally cylindrical housing with an open end and closed end;
    a generally cylindrical filter element disposed within said housing, said filter element having an open end and a closed end;
    a cover mounted in the open end of said housing;
    said cover being of integral one-piece construction including a hub extending substantially into said housing and defining a first flow opening, a circular rim surrounding the hub in spaced relationship therewith, radial ribs connected between the hub and rim and defining second flow openings therebetween, and a peripheral lip on the rim;
    the open end of said housing surrounding the rim of said cover and being folded inwardly in a generally P-shaped cross-sectional configuration over the peripheral lip of the rim to interconnect said cover and housing;
    a first seal disposed between said cover and housing in a circumferential groove formed in the rim of said cover;
    a second seal between the open end of said filter element and said cover;
    a third seal disposed in a groove formed in said cover about the flow openings therein; and
    means formed on said cover for removably mounting the filter.

11. The spin-on filter of claim 10, wherein the ribs of said cover are circumferentially spaced at substantially equal intervals and are of substantially uniform depth and thickness.

12. The spin-on filter of claim 10, wherein said mounting means comprises threads formed on the hub of said cover.

13. The spin-on filter of claim 10, wherein said second seal comprises a radial seal surrounding at least a portion of the hub of said cover extending into said housing.

14. The spin-on filter of claim 10, further including:
    means for interlocking said cover and housing against relative rotation.

15. The spin-on filter according to claim 14, wherein said interlocking means comprises indentations formed about said housing for receiving portions of at least some of the ribs of said cover.

16. The spin-on filter of claim 10, further including:
    spacers disposed between the closed end of said filter element and said housing for ensuring pressure equalization across said filter element.

17. A spin-on filter, comprising:
    a generally cylindrical housing with an open end and closed end;
    a generally cylindrical filter element disposed within said housing, said filter element having an open end and a closed end;
    a cover disposed in the open end of said housing;
    said cover being of integral one-piece construction including a hub extending substantially into said housing and defining a first flow opening, a circular rim surrounding the hub in spaced relationship therewith, and radial ribs connected between the hub and rim and defining second flow openings therebetween;
    the open end of said housing surrounding the rim of said cover and being folded inwardly and back on itself in a predetermined configuration about the rim to interconnect said cover and housing;
    a first seal disposed between said cover and housing in a circumferential groove formed in the rim of said cover;

a second seal disposed between the open end of said filter element and said cover;

a third seal disposed in a groove formed in said cover about the flow openings therein;

means for interlocking said cover and housing against relative rotation;

means for maintaining predetermined spacing between the lower end of said filter element; and means formed on said cover for detachably mounting the filter.

18. The spin-on filter of claim 17, wherein the rim of said cover includes a peripheral lip and wherein the upper end of said housing is folded in a generally P-shaped cross-sectional configuration.

19. The spin-on filter of claim 17, wherein the upper end of said housing is folded in an inverted generally b-shaped cross-sectional configuration over the rim of said cover.

20. The spin-on filter of claim 17, wherein said mounting means comprises internal threads formed on the hub of said cover.

21. The spin-on filter of claim 17, wherein said second seal comprises a radial seal surrounding at least a portion of the hub on said cover extending into said housing.

22. The spin-on filter of claim 17, wherein said interlocking means comprises indentations formed about said housing for receiving portions of at least some of the ribs of said cover.

23. The spin-on filter of claim 17, wherein said spacing means comprises projections integrally formed at circumferentially spaced intervals about the closed end of said filter element.

* * * * *